United States Patent
Bergh et al.

(10) Patent No.: US 7,118,917 B2
(45) Date of Patent: Oct. 10, 2006

(54) PARALLEL FLOW REACTOR HAVING IMPROVED THERMAL CONTROL

(75) Inventors: H. Sam Bergh, San Francisco, CA (US); Shenheng Guan, Palo Alto, CA (US); James R. Engstrom, Ithaca, NY (US); Steffen Hardt, Mainz (DE); Astrid Lohf, Karlsruhe (DE); Frank Michel, Bad Mergenthaim (DE)

(73) Assignee: Symyx Technologies, Inc., Santa Clara, CA (US)

( * ) Notice: Subject to any disclaimer, the term of this patent is extended or adjusted under 35 U.S.C. 154(b) by 665 days.

(21) Appl. No.: 10/094,257

(22) Filed: Mar. 7, 2002

(65) Prior Publication Data

US 2002/0170976 A1 Nov. 21, 2002

Related U.S. Application Data

(60) Provisional application No. 60/274,065, filed on Mar. 7, 2001.

(51) Int. Cl.
*G01N 31/00* (2006.01)
*B01J 19/00* (2006.01)

(52) U.S. Cl. .................. 436/37; 436/180; 436/183; 422/129; 422/130; 422/100

(58) Field of Classification Search ............. 422/130, 422/129, 131, 100; 436/37, 43, 180, 183
See application file for complete search history.

(56) References Cited

U.S. PATENT DOCUMENTS

| | | | |
|---|---|---|---|
| 3,431,077 A | 3/1969 | Danforth | 23/253 |
| 3,536,452 A | 10/1970 | Norton et al. | 23/259 |
| 4,099,923 A | 7/1978 | Milberger | 23/254 R |
| 4,705,669 A | 11/1987 | Tsuji et al. | 422/93 |
| 4,869,282 A | 9/1989 | Sittler et al. | 137/15 |
| 4,996,387 A | 2/1991 | Gerhold et al. | 585/654 |
| 5,089,232 A | 2/1992 | May | 422/83 |
| 5,252,294 A | 10/1993 | Kroy et al. | 422/102 |
| 5,304,354 A | 4/1994 | Finley et al. | 422/196 |
| 5,324,483 A | 6/1994 | Cody et al. | 422/131 |
| 5,417,938 A | 5/1995 | Shelden et al. | 422/196 |
| 5,534,328 A | 7/1996 | Ashmead et al. | 428/166 |
| 5,580,523 A | 12/1996 | Bard | 422/50 |
| 5,589,136 A | 12/1996 | Northrup et al. | 422/102 |
| 5,593,642 A | 1/1997 | DeWitt et al. | 422/131 |
| 5,595,712 A | 1/1997 | Harbster et al. | 422/129 |
| 5,603,351 A | 2/1997 | Cherukuri et al. | 137/597 |
| 5,611,214 A | 3/1997 | Wegeng et al. | 62/498 |

(Continued)

FOREIGN PATENT DOCUMENTS

DE 27 14 939 B2 11/1979

(Continued)

OTHER PUBLICATIONS

Berenschot, J.W., et al., "Micromachining of (111) Plates in <001> Oriented Silicon", *J. Micromech. Microeng.* 8 (1998) 104-107.

(Continued)

*Primary Examiner*—N. Bhat

(57) ABSTRACT

Parallel flow chemical processing systems, such as parallel flow chemical reaction systems are disclosed. These systems are adapted to simultaneously and independently vary temperature between separate flow channels, preferably by employing separate, individual heating elements in thermal communication with each of four or more parallel flow reactors. The flow reactors are preferably isolated from each other using a thermal isolation system comprising fluid-based heat exchange. In preferred embodiments, the axial heat flux can be fixedly or controllably varied.

9 Claims, 4 Drawing Sheets

U.S. PATENT DOCUMENTS

| | | | |
|---|---|---|---|
| 5,639,423 A | 6/1997 | Northrup et al. | 122/50 |
| 5,658,537 A | 8/1997 | Dugan | 422/191 |
| 5,690,763 A | 11/1997 | Ashmead et al. | 156/60 |
| 5,750,906 A | 5/1998 | Parker et al. | 73/863.73 |
| 5,776,359 A | 7/1998 | Schultz et al. | 252/62.51 |
| 5,780,748 A | 7/1998 | Barth | 73/861.47 |
| 5,811,062 A | 9/1998 | Wegeng et al. | 422/129 |
| 5,833,926 A | 11/1998 | Wurzel et al. | 422/81 |
| 5,842,787 A | 12/1998 | Kopf-Sill et al. | 366/340 |
| 5,843,385 A | 12/1998 | Dugan | 422/191 |
| 5,863,801 A | 1/1999 | Southgate et al. | 436/63 |
| 5,865,417 A | 2/1999 | Harris et al. | 251/11 |
| 5,869,004 A | 2/1999 | Parce et al. | 422/100 |
| 5,872,010 A | 2/1999 | Karger et al. | 436/173 |
| 5,922,591 A | 7/1999 | Anderson et al. | 435/287.2 |
| 5,927,325 A | 7/1999 | Bensaoula et al. | 137/599 |
| 5,959,297 A | 9/1999 | Weinberg et al. | 250/288 |
| 5,985,356 A | 11/1999 | Schultz et al. | 427/8 |
| 6,004,617 A | 12/1999 | Schultz et al. | 427/8 |
| 6,030,917 A | 2/2000 | Weinberg et al. | 502/104 |
| 6,033,544 A | 3/2000 | Demers et al. | 204/450 |
| 6,063,633 A | 5/2000 | Willson | 436/37 |
| 6,087,181 A | 7/2000 | Cong | 436/37 |
| 6,149,882 A | 11/2000 | Guan et al. | 422/211 |
| 6,175,409 B1 | 1/2001 | Nielsen et al. | 356/337 |
| 6,616,909 B1* | 9/2003 | Tonkovich et al. | 423/648.1 |
| 6,680,044 B1* | 1/2004 | Tonkovich et al. | 423/652 |
| 6,737,026 B1* | 5/2004 | Bergh et al. | 422/130 |
| 6,749,814 B1* | 6/2004 | Bergh et al. | 422/130 |
| 6,805,841 B1* | 10/2004 | Shvets et al. | 422/100 |
| 6,881,312 B1* | 4/2005 | Kopf-Sill et al. | 204/453 |
| 6,902,934 B1* | 6/2005 | Bergh et al. | 436/37 |
| 2002/0014106 A1 | 2/2002 | Srinivasan et al. | |
| 2002/0042140 A1 | 4/2002 | Hagemeyer et al. | |
| 2002/0045265 A1 | 4/2002 | Bergh et al. | |
| 2002/0048536 A1 | 4/2002 | Bergh et al. | |
| 2004/0141893 A1* | 7/2004 | Martin | 422/198 |
| 2005/0009175 A1* | 1/2005 | Bergh et al. | 435/287.2 |
| 2005/0175519 A1* | 8/2005 | Rogers et al. | 422/188 |

FOREIGN PATENT DOCUMENTS

| | | |
|---|---|---|
| DE | DD 234941 A1 | 4/1986 |
| DE | 196 32 779 A1 | 2/1998 |
| DE | 198 05 719 A1 | 8/1999 |
| DE | 198 06 848 A1 | 8/1999 |
| DE | 198 09 477 A1 | 9/1999 |
| DE | 198 55 894 A1 | 6/2000 |
| EP | 0 796 654 A2 | 9/1997 |
| EP | 0 886 143 A1 | 12/1998 |
| GB | 967261 | 3/1962 |
| WO | WO 98/07026 | 2/1996 |
| WO | WO 96/15576 | 5/1996 |
| WO | WO 97/32208 | 9/1997 |
| WO | WO 98/00231 | 1/1998 |
| WO | WO 98/03521 | 1/1998 |
| WO | WO 98/13137 | 4/1998 |
| WO | WO 98/13605 | 4/1998 |
| WO | WO 98/16949 | 4/1998 |
| WO | WO 98/22811 | 5/1998 |
| WO | WO 98/53236 | 11/1998 |
| WO | WO 98/55852 | 12/1998 |
| WO | WO 98/56505 | 12/1998 |
| WO | WO 99/41005 | 8/1999 |
| WO | WO 99/64160 | 12/1999 |
| WO | WO 00/09255 | 2/2000 |
| WO | WO 00/14529 | 3/2000 |
| WO | WO 00/17413 | 3/2000 |
| WO | WO 00/51720 | 9/2000 |
| WO | WO 01/00315 | 1/2001 |

OTHER PUBLICATIONS

Brenchley, D.L. et al., "Status of Microchemical Systems Development in the United States of America", AICHE, 2nd International Conference on Microreaction Technology, New Orleans, Louisiana, Mar. 9-12, 1998, pp. 18-23.

Bruns, M.W., "The Application of Silicon Micromachining Technology and High Speed Gas Chromatography to On-Line Process Control", *MTI Analytical Instruments*.

Bruns, M.W., "Silicon Micromachining and High Speed High Gas Chromatography", *IEEE*, 1992, pp. 1640-1644.

Bryzek, J. et al., "Micromachines on the March", *IEEE Spectrum*, 1994, pp. 20-31.

Burns, J.R. et al., "Development of Microreactor for Chemical Production", AICHE, 2nd International Conference on Microreaction Technology, New Orleans, Louisiana, Mar. 9-12, 1998, pp. 39-44.

Cooke, William S., 403P "Decreasing Gas Chromatagrphy Analysis Times Using a Multicapillary Column", PITTCON '96, Chicago, Illinois, Mar. 3-8, 1996.

Franz, A.J. et al., "New Operating Regimes and Applications Feasible with Microreactors", MIT, 1997, pp. 33-38.

Greenway, G.M. et al., "The Use of a Novel Microreactor for High Throughput Continuous Flow Organic Synthesis", *Sensors and Actuators B*, 2000, pp. 153-158.

Grosjean et al., "A Practical Thermopneumatic Valve", *IEEE*, 1999, pp. 147-152.

Haswell, Stephen J. et al., "The Application of Micro Reactors to Synthetic Chemistry", *Chem. Commun.*, 2001, 391-398.

Hendrix, Charles D., "What Every Technologist Should Know About Experimental Design", *Chemtech*, 1979, pp. 167-174.

Henning, A.K. et al., "Microfluidic MEMS for Semiconductor Processing", *IEEE*, 1998, vol. 21, pp. 329-337.

Hinderling, C. et al., "Rapid Screening of Olefin Polymerization Catalyst Libraries by Electrospray Ionization Tandem Mass Spectrometry", *Angew. Chem. Int. Ed.*, 1999, 38, No. 15, pp. 2253-2256.

Jäckel, K.-P., "Microtechnology: Application Opportunities in the Chemical Industry", *DECHEMA Monographs*, 1996, vol. 132, VCH Vertagsgesellschaft, pp. 29-50.

Johansson, S. et al., "Nanofabrication of Model Catalysts and Simulations of their Reaction Kinetics", *J. Vac. Sci. Technol.*, 1999, A 17(1), pp. 297-302.

Klein, J. et al., "Combinatorial Material Libraries on the Microgram Scale with an Example of Hydrothermal Synthesis", *Angew. Chem. Int. Ed.*, 1998, 37(24); 3369-3372.

Lambert, R.H. et al., "Utilization of a Portable Microchip Gas Chromatograph to Identify and Reduce Fugitive Emissions at a Pharmaceutical Manufacturing Plant", *Field Analytical Chemistry and Technology*, 1997, 1(6): 367-374.

Löwe, H. et al., "Microreactor Concepts for Heterogeneous Gas Phase Reactions", AICHE, 2nd International Conference on Microreaction Technology, New Orleans, Louisiana, Mar. 9-12, 1998, pp. 63-73.

Matlosz, M. et al., "Microsectioned Electrochemical Reactors for Selective Partial Oxidation", AICHE, 2nd International Conference on Microreaction Technology, New Orleans, Louisiana, Mar. 9-12, 1998, pp. 54-59.

Oosterbroek, R.E. et al., "Utilizing the (111) Plane Switch-Over Etching Process for Micro Fluid Control Applications".

Pérez-Ramirez, J. et al., "The Six-Flow Reactor Technology-A Review on Fast Catalyst Screening and Kinetic Studies", *Catalysis Today*, 2000, 60, 93-109.

Rich et al., "An 8-Bit Microflow Controller Using Pneumatically-Actuated Valves", *IEEE*, 1999, pp. 130-134.

Sadler, D.J. et al., "A New Magnetically Actuated Microvalve For Liquid and Gas Control Applications", Center for Microelectronic Sensors and MEMS, Univeristy of Cincinnati.

Sie, S.T., "Miniaturization of Hydroprocessing Catalyst Testing Systems: Theory and Practice", *AIChE Journal*, 1996, vol. 42, No. 12, pp. 3498-3507.

Srinvasan, R. et al., "Micromachined Reactors for Catalytic Partial Oxidation Reactions", AICHE Journal, 1997, vol. 43, No. 11, pp. 3059-3069.

Tonkovich, A.Y. et al., "The Catalytic Partial Oxidation of Methane in a Microchannel Chemical Reactor", AICHE, 2nd International Confernece on Microreaction Technology, New Orleans, Louisiana, Mar. 9-12, 1998, pp. 45-53.

Wang et al., "A Parylene Micro Check Valve", *IEEE*, 1999, pp. 177-182.

Weissmeier, G. et al., "Strategy for the Development of Micro Channel Reactors for Heterogeneously Catalyzed Reactions".

Wijngaarden et al., "Industrial Catalysts —Optimizing Catalysts and Processes", Wiley-VCH, Germany (1998).

Zdeblick et al., "Thermopneumatically Actuated Microvalves and Integrated Electro-Fluidic Circuits", TRF, Solid State Sensor and Actuator Workshop, Hilton Head, South Carolina, Jun. 13-16, 1994, pp. 251-255.

Zech, T. et al., "Simultaneous Screening of Catalysts in Microchannels: Methodology and Experimental Setup".

Zieren, M. et al., "Time-Resolved Calorimetry in a New Type of Micro Fluid Reactor Using Spatially Separated Thin-Film Thermopiles and FIA-Technique", AICHE, 2nd International Conference on Microreaction Technology, New Orleans, Louisiana, Mar. 9-12, 1998, pp. 154-163.

* cited by examiner

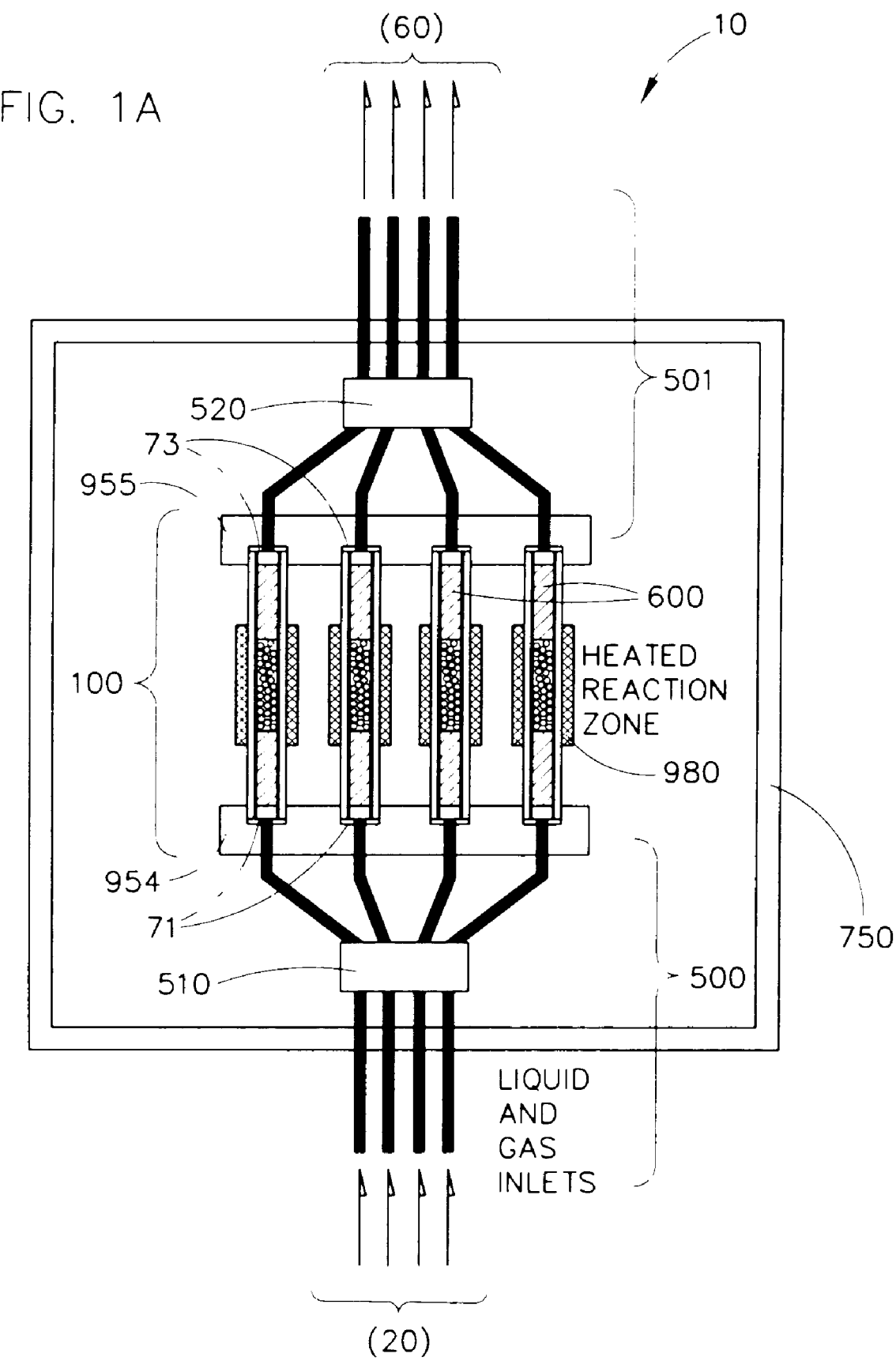

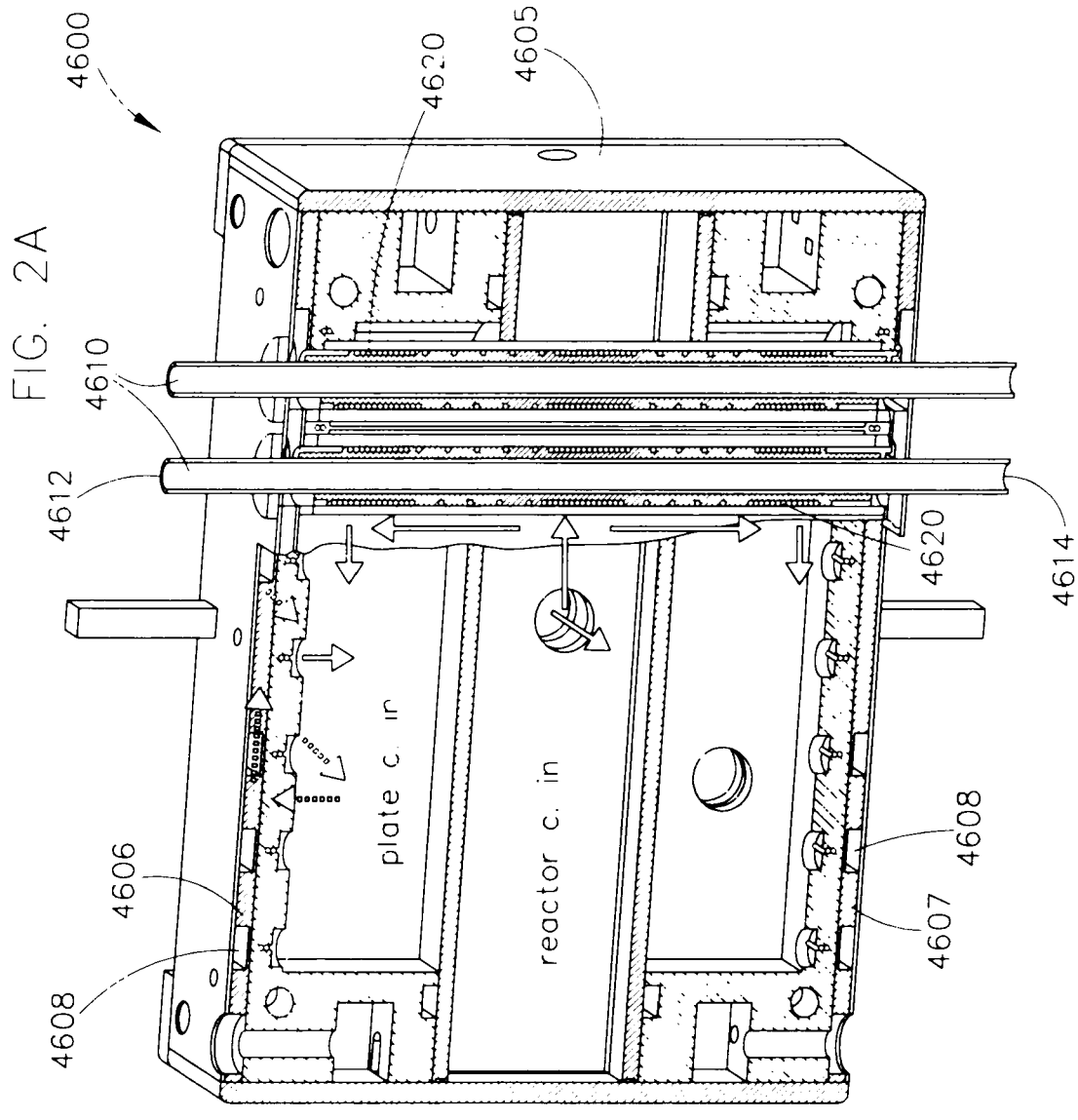
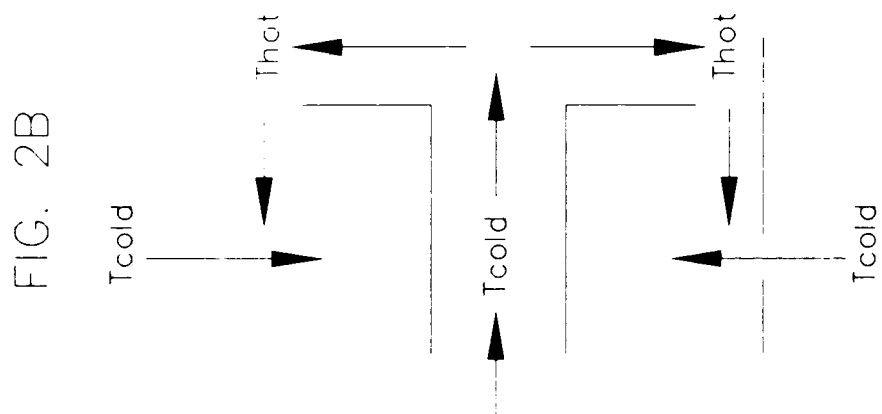

PARALLEL FLOW REACTOR HAVING IMPROVED THERMAL CONTROL

This application claims priority to co-owned, U.S. Ser. No. 60/274,065 entitled "Parallel Flow Reactor Having Improved Thermal Control" filed Mar. 7, 2001 by Bergh et al.

BACKGROUND OF INVENTION

The present invention generally relates to materials science research, and specifically, to combinatorial (i.e., high throughput) materials science research directed toward the identification and/or optimization of new materials. The invention particularly relates, in preferred embodiments, to apparatus and methods for optimizing chemical reaction systems, such as chemical reaction systems involving heterogeneous catalysts.

In recent years, significant efforts have been extended toward developing parallel systems, such as parallel reactors, for the purpose of screening different materials, such as heterogeneous catalysts, for particular properties of interest, such as catalysis. U.S. Pat. No. 5,985,356 to Schultz et al. discloses synthesis and screening arrays of materials in parallel for catalysis, and U.S. Pat. No. 6,063,633 to Willson discloses parallel flow reactors, and parallel screening techniques (e.g., thermography, chromatography, etc.) for evaluating catalysis. A substantial portion of such effort has, however, focussed on apparatus and methods for evaluating compositional space of the materials (e.g., heterogeneous catalysts) of interest, while only a relatively small portion of such effort has been directed toward apparatus and methods for evaluating other parameter spaces—in addition to compositional space. More specifically for example, in the context of heterogeneous catalysis research, only limited attention has been focused on the development of apparatus and methods for high-throughput, parallel optimization of important parameters such as catalyst (or catalyst precursor) processing conditions and reaction conditions.

A number of parallel flow reactors are known in the art. For example, PCT application WO 98/07206 (Hoechst) discloses a parallel flow reactor said to be useful for evaluating chemical reactions using minaturized reactors. U.S. Pat. No. 6,149,882 to Guan et al. discloses, among other facets, a parallel flow reactor for screening of heterogeneous catalysts in which feed flow is controlled using flow restrictors such as capillaries to obtain substantially the same flow in each of the reaction channels. More recently, WO 00/51720 (Symyx Technologies, Inc.) discloses a parallel flow reactor design that addresses several significant technical challenges, including flow distribution challenges for parallel screening of catalysts in very large numbers. Other references, including WO 97/32208 (Technology Licensing Co., Ltd.), DE 19809477 (Schuth), WO 99/41005 (BASF) and DE 19806848 (BASF) likewise disclose parallel flow reactor configurations. Various of the aforementioned references contemplate control of the reaction temperature in the parallel reactors, including for example, applying a thermal gradient across a plurality of reactors to investigate temperature effects on a reaction of interest. Typically, thermal control is effected for all of the reaction vessels, collectively, or for a subset of the reaction vessels as modules or zones.

These and other reactor designs known in the art do not, however, specifically address approaches or contemplate apparatus for investigating and/or optimizing reaction temperature—simultaneously and independently—in relatively closely-packed, highly parallel reactors. As reactor dimensions become reduced, and as the spatial density of reactors increases, significant thermal cross-talk between reaction vessels can be a substantial obstacle for achieving simultaneous and independent temperature control in such reaction systems.

Hence, there remains a need in the art to overcome such deficiencies, and to provide for parallel flow reactors having robust temperature-control capabilities for systematically investigating and/or optimizing chemical processes with respect to temperature.

SUMMARY OF THE INVENTION

It is therefore an object of the present invention to provide apparatus and methods for more efficient identification and/or optimization of materials and/or temperature conditions in chemical processing systems (e.g., chemical reaction systems), where temperature can be independently significant with respect to performance in the application of interest.

Briefly, therefore, the present invention is directed to parallel (e.g. multi-channel) chemical processing systems, and especially, chemical processing Microsystems. Although primarily discussed and exemplified herein in the context of parallel reactors, and especially parallel microreactors, it is to be understood that the invention has applications in other chemical processing systems (e.g. mixing systems, separation systems, material-processing systems, etc.), some of which are discussed in varying detail below.

The invention is directed, in one embodiment, to parallel reaction systems having the capability to simultaneously and independently vary temperature between separate channels. The parallel flow reaction systems can generally include a reactor module that comprises four or more parallel flow reactors having separate and independent temperature control for each of the four or more reactors. Preferably, the temperature control system is adapted to provide individually variable temperature differences of at least about 5° C., preferably at least about 10° C. as compared between four or more spatially adjacent reactors. Advantageously, in some embodiments, the thermal control system of the reaction system is capable of providing even higher temperature differences between spatially adjacent reactors—such as at least about 20° C., at least about 50° C., at least about 100° C., at least about 150° C. or at least about 200° C.

The chemical reaction system of the invention generally comprises four or more reactors and a fluid distribution system. Each of the reactors comprises a surface defining a reaction cavity for carrying out a chemical reaction, an inlet port in fluid communication with the reaction cavity, and an outlet port in fluid communication with the reaction cavity. The reaction cavity has a volume of not more than about 100 ml, preferably not more than about 50 ml, 20 ml, or 10 ml, and in some applications, not more than about 7 ml, 5 ml, 3 ml, 1 ml, 100 µl, 10 µl or 1 µl. The reaction volume can be the same or different for the four or more reactors. The fluid distribution system can simultaneously supply one or more reactants from one or more external reactant sources to the inlet port of the reaction cavity for each of the four or more reactors, and can discharge a reactor effluent from the outlet port of each such reaction cavity to one or more external effluent sinks. As such, the invention generally comprises a four- (or more-) channel parallel flow reactor, preferably of micro-scale (e.g, not more than about 1 ml, for purposes hereof). The reaction system can further comprise a detection system, integral or separate from the reaction system, for evaluating the reactions, for example, by detecting one or more reaction products or unreacted reactants in the effluent streams of the four or more reactors.

Significantly, in a particularly preferred embodiment, the temperature of each of the four or more reaction vessels is simultaneously and independently controlled using separately-controlled heating elements (e.g. resistive heating elements such as coil heaters) around each of the four or more reactors, while thermal isolation between the four or more reactors is accomplished by fluid-based heat exchange with an external heat sink. Preferably, the fluid heat exchange includes forced convection of a fluid between isolated, individually-heated reactors. The fluid is preferably a gas, although a liquid is suitable for some embodiments. In particularly preferred embodiments, the fluid-type heat exchanger includes at least one heat-exchange fluid inlet (with fresh, typically colder fluid) in the vicinity of the reaction zone of the reactors.

In preferred embodiments, the heat flux being applied to each of the reactors has a spatial profile, preferably an axial profile (taken along the length of the flow reactor, with the direction of flow) that can be varied (fixedly varied, or controllably varied). Preferably, the heat-flux provided by the heating elements can be axially varied to achieve a substantially uniform axial temperature profile. Specifically, the heating elements can be configured and arranged to achieve an axial temperature profile (for the operating temperatures of the reactors, discussed below) that varies by less than about 10%, preferably less than about 5%, more preferably less than about 3% and most preferably less than about 1% over a dimension (e.g., the length) of the reaction zone that corresponds to the axial flow path of the reactants through the flow reactor. The axially-variable heat-flux provided by the heating elements can compensate for variations in the heat-flux in the reaction zone (e.g., hotter regions near the center of the reaction zone or generally, other hot-spots), as well as variations in the heat-flux profile associated with the circulating heat-exchange fluid cooling the reactors. In another embodiment, the heat flux can also be varied spatially over the array (e.g., as compared between different reactors), and to compensate for the varied locations of the four or more reactors relative to other reactors and to the external environment (e.g. reactors that are centered in the array versus reactors near an external edge of the reactor module). Hence, design and/or control of the heating elements for each of the reactors can effect a substantially axially-uniform temperature profile for each of the four or more reactors independently, and without regard to the relative location within the array of reactors.

The invention is particularly advantageous for reaction systems having thermal management challenges—such as exist for such reactor modules in which the four or more flow reactors are close-packed—that is, in which the four or more reactors have a spatial density, taken along one or more cross-sections of a two-dimensional array, of not less than about 1 reactor/100 $cm^2$, preferably not less than about 1 reactor/50 $cm^2$, more preferably not less than about 1 reactor/10 $cm^2$, and, in some applications, not less than about 1 reactor/$cm^2$, not less than about 2 reactors/$cm^2$, not less than about 1 reactor/$mm^2$. In alternative embodiments having a linear array or curvilinear array of reactors, the spatial density, taken along a centerline of the linear array or curvilinear array, can be not less than about 1 reactor/10 cm, preferably not less than about 1 reactor/7.5 cm, more preferably not less than about 1 reactor/3 cm, and, in some applications, not less than about 1 reactor/cm, not less than about 2 reactors/cm, or not less than about 1 reactor/mm. The close-packed nature of the reactors can also be characterized, especially for reactors comprising elongated reaction vessels, with respect to spacing of the reactors. In one embodiment, the center-to-center distance between adjacent reactors, taken at a cross-section substantially perpendicular to the direction of flow, is preferably not more than about 10 times the diameter of the reactor (for reactors with circular cross-sections), or more generally, not more than about 10 times the length of a chord intersecting the center of the reactor (for reactors having a non-circular geometry (e.g., hexagon, octagon, etc.). Preferably in such embodiment, the center-to-center distance between adjacent reactors, taken at a cross-section substantially perpendicular to the direction of flow, is preferably not more than about 7 times, and more preferably not more than about 5 times the diameter (or more generally, the length of a chord intersecting the center of the reactor). The center-to-center distance between adjacent reactors can preferably range from about 1.5 times to about 10 times, more preferably from about 2 times to about 7 times, and most preferably from about 3 times to about 5 times the diameter (or more generally, the length of a chord intersecting the center of the reactor), and is especially preferably about 3 times or about 4 times the diameter or related chord length. This is particularly true for higher numbers of close-packed reactors (e.g., having a spatial density of not less than about 1 reactor/100 $cm^2$ (two-dimensional array) or not less than about 1 reactor/10 cm (linear array or curvilinear array), or characterized by a center-to-center distance of not more than about 10 times the diameter (or more generally, the length of a chord intersecting the center of the reactor), such as six or more reactors, eight or more such reactors, twelve or more such reactors, sixteen or more such reactors, or more (as described below) and especially where at least one, and preferably two or more of such higher numbers of reactors are spatially nested—that is, are configured and arranged in a two-dimensional array (or three-dimensional array) having at least one reactor that is about equidistant from at least three other reactors, and is preferably about equidistant from at least four other reactors. For example, a spatially nested reactor can be arranged internally to peripheral reactors (e.g., an outer ring of peripheral reactors), such that each spatially nested reactor has at least three adjacent reactors, each of which is preferably substantially the same distance from the spatially nested reactor.

The invention is also directed to methods of using such reaction systems, and generally, such chemical processing systems, for example, for evaluating catalytic reactions at various process temperatures in a parallel flow chemical reactor. The method of the invention can comprise, in a preferred embodiment, simultaneously feeding reactants to a set of four or more parallel reactors through a fluid distribution system. Each of the four or more reactors comprise a catalyst effective for catalyzing a reaction of interest, with the catalyst being substantially the same or different as compared between the four or more reactors. The catalysts are simultaneously contacted with the reactants with in each of the four or more reactors under reaction conditions effective for the reaction of interest. The temperature is preferably controlled to be greater than about 100° C. during the course of the reaction. Also, the temperature of the reaction zone of the four or more reactors is independently and controllably varied as compared between channels, such that during the course of the reaction, temperature differences of at least about 5° C., preferably at least about 10° C. are effected as compared between four or more spatially adjacent reactors. In some method embodiments, even higher temperature differences can be run simultaneously between spatially adjacent reactors—such as at least about 20° C., at least about 50° C., at least about 100° C., at least about 150° C. or at least about 200° C. The temperature control system can comprise four or more individually-controllable heating elements in thermal communication with the four or more reactors, respectively. In preferred embodiments, each of the four or more reactors can be thermally isolated from each other during the course of the reaction by forced-convection heat transfer from the reactor to the heat-exchange fluid. In preferred embodiments, the heat flux to each of the four or more reactors can be axially varied, to afford substantial flexibility for independently controlling the axial temperature profile for each of the four or more reactors. For example, the method can include varying the axial heat flux of each of the four or more reactors such that the axial temperature profile is substantially uniform, and in some embodiments, such that the axial temperature profile (for the operating temperatures of the reactors, discussed below) varies by less than about 10%, preferably less than about 5%, more preferably less than about 3% and most preferably less than about 1% over a dimension (e.g., the length) of the reaction zone that corresponds to the axial flow path of the reactants through the flow reactor. The catalytic performance of each of the reactions can be determined by approaches and instruments known in the art, for example, by monitoring the reaction (e.g. heat of reaction) or by determining the composition of reaction products and/or unreacted reactants (e.g., by infrared spectroscopy, gas chromatography, liquid chromatoagraphy, etc.).

Although especially useful in connection with parallel flow reactors, the temperature-control system disclosed in the aforementioned patent application can have applications for control of other types of reaction systems (e.g., batch reactors, semi-continuous reactors) and/or in non-reaction chemical processing systems such as catalyst pretreatment protocols (e.g. calcining of heterogeneous catalysts) or material characterization (e.g. catalyst characterization) where parallel, independent temperature control is desirable, especially where high-temperature contact with a flowing fluid is involved.

The inventions disclosed herein, as well as various permutations and combinations thereof, can be advantageously and flexibly employed in optimizing temperature and temperature-dependent properties chemical systems of interest, and especially for optimizing post-synthesis, pre-reaction processing/treatment conditions and/or reaction systems for potential heterogeneous catalysts for a particular reaction of interest.

Other features, objects and advantages of the present invention will be in part apparent to those skilled in art and in part pointed out hereinafter. All references cited in the instant specification are incorporated by reference for all purposes. Moreover, as the patent and non-patent literature relating to the subject matter disclosed and/or claimed herein is substantial, many relevant references are available to a skilled artisan that will provide further instruction with respect to such subject matter.

BRIEF DESCRIPTION OF THE DRAWINGS

FIGS. 1A and 1B are schematic views of a four-channel parallel flow reactor (FIG. 1A), with a detail of one of the reaction vessels thereof (FIG. 1B).

FIGS. 2A through 2C are cross-sectional or schematic views of a twenty-four channel parallel flow reactor (FIG. 2A) illustrating a preferred temperature control system of the invention, including a schematic heat-exchange fluid flowpath (FIG. 2B) and a detail of one half of one of the reaction vessels thereof (FIG. 2C).

DETAILED DESCRIPTION OF PREFERRED EMBODIMENTS

Figure 1B:
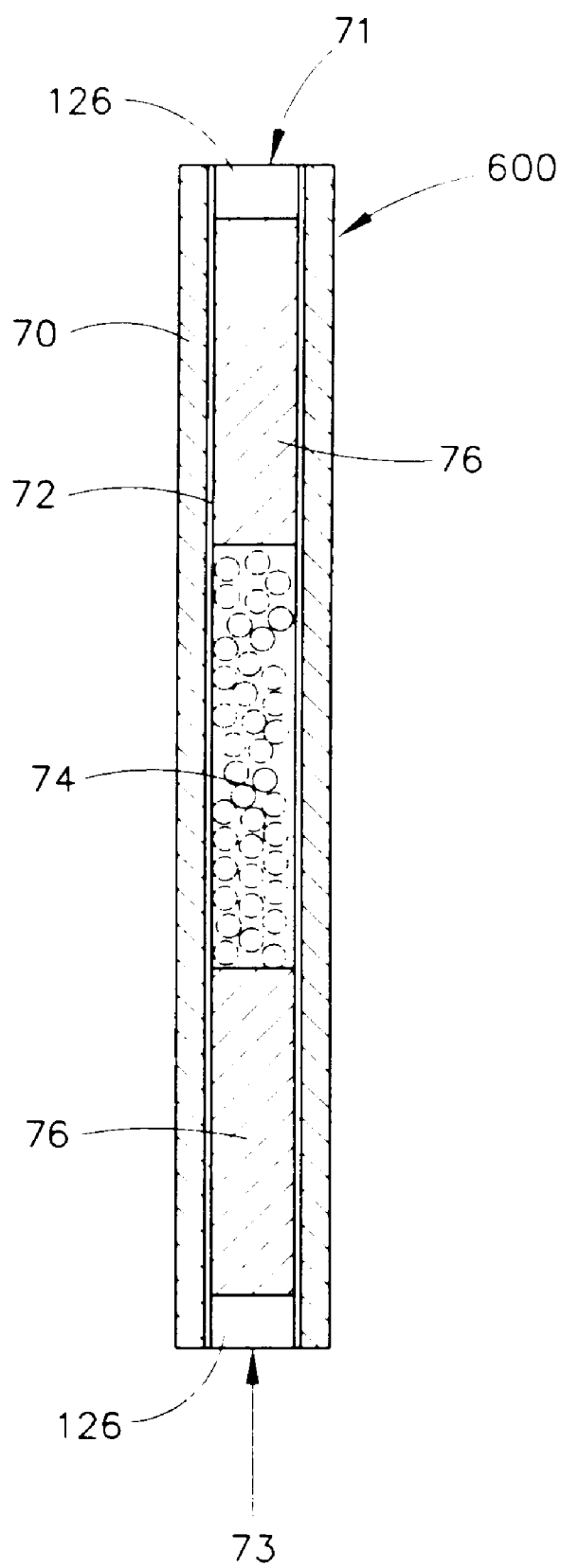

The present invention is related to the following patents and/or patent applications, each of which is hereby incorporated by reference for all purposes, including for the purpose of combination of various features disclosed in the various related applications to various features disclosed herein, to the highest extent practical, based on the knowledge in the art, and coupled with the guidance of this application and the related applications: (1) co-owned U.S. patent application Ser. No. 60/187,566 entitled "Apparatus and Methods for Multi-Variable Optimization of Reaction Systems and Other Chemical Processing Microsystems", filed Mar. 7, 2000 by Bergh et al, (2) co-owned U.S. patent application Ser. No. 60/229,984 entitled "Apparatus and Methods for Optimization of Process Variables in Reaction Systems and Other Chemical Processing Systems", filed Sep. 2, 2001 by Bergh et al; (3) co-owned U.S. Pat. No. 6,149,882 to Guan et al. entitled "Parallel Fixed-Bed Reactor and Fluid Contacting Apparatus and Method"; (4) co-owned, co-pending U.S. patent application Ser. No. 09/518,794, entitled "Chemical Processing Microsystems, Diffusion-Mixed Microreactors and Methods for Preparing and Using Same", filed Mar. 3, 2000 by Bergh et al.; (5) co-owned, co-pending U.S. Ser. No. 09/801,390 entitled "Parallel-Flow Process Optimization Reactor" filed Mar. 7, 2001 by Bergh et al.; (6) co-owned, co-pending U.S. Ser. No. 09/801,389 entitled "Parallel Flow Reactor Having Variable Feed Composition" filed Mar. 7, 2001 by Bergh et al.; (7) co-owned, co-pending U.S. Ser. No. 60/274,022 entitled "Gas Chromatograph Injection Valve Having Microvalve Array" filed Mar. 7, 2001 by Bergh et al.; and (8) co-owned, co-pending U.S. Ser. No. 09/801,430 entitled "Parallel Gas Chromatograph with Microdetector Array" filed Mar. 7, 2001 by Srinivasan et al.; and (9) co-owned, co-pending U.S. Ser. No. 09/901,858 entitled "Methods for Analysis of Heterogeneous Catalysts in a Multi-Variable Screening Reactor" filed Jul. 9, 2001 by Hagemeyer et al. Further reference to several of these applications is made below, in the context of the present invention.

In a preferred embodiment of the present invention, a chemical processing system is a reaction system that comprises a plurality of reactors, a fluid distribution system, a temperature control system, and optionally, a detection system. Generally, the fluid distribution system can comprise an inlet subsystem for providing reactants to the reactors, and an outlet subsystem for discharging effluents from the reactors. A feed-composition subsystem—for providing different feed compositions to the reactors can be included in the inlet subsystem. A flow-partitioning subsystem—for providing different flow rates to the reactors, and/or a pressure-partitioning subsystems—for providing different pressures in the reactors, can be included as part of the inlet subsystem and/or in the outlet subsystem. A feed temperature control subsystem can also be included, for temperature control of feed being supplied to the reactors. The temperature control system and the reactors are described in further detail below. The detection system can be a separate, stand-alone system, or can be integral with the reaction system.

The temperature control system generally comprises four or more individually-controllable heating elements, preferably resistive heating elements, in thermal communication with four or more reactors, respectively. A forced convection cooling system can provide thermal isolation between the four or more reactors.

More specifically, the temperature of each of the four or more reaction vessels is simultaneously and independently controlled using separately-controlled heating elements. The heating elements can be resistive heating elements such as resistive coil heaters associated with each reactor, or resistive band heaters associated with each reactor. Alternatively, other types of heating elements can be employed, including for example, fluid-based heat-transfer elements (e.g., molten salt bath) associated with each reactor, or heating elements involving irradiation with electromagnetic energy (e.g, localized infrared radiation, visible radiation, microwave radiation, radio frequency (RF) radiation, etc.), such as can be provided using fiber optics, lasers, or other approaches. The heating elements are in thermal communication, preferably via conduction (i.e., thermally conductive communication) with the reactors. The heating elements can be adapted to effect a reaction temperature (or generally, chemical processing temperature) in the individual reactors at temperatures greater than about 50° C., preferably greater than about 100° C., more preferably greater than about 200° C., and in some embodiments, more preferably greater than about 300° C. Hence the reaction temperature (or generally, chemical processing temperature) effected by the individually-controlled heating elements can range from about 50° C. to about 1500° C., preferably from about 100° C. to about 1000° C., and more preferably from about 200° C. to about 800° C. In some embodiments, depending on the particular chemical reaction or process of interest, the heating elements can be adapted to effect a reaction temperature (or generally, chemical processing temperature) in the individual reactors ranging from about 300° C. to about 600° C. or from about 400° C. to about 600° C.

Thermal isolation between the four or more reactors is accomplished by fluid-based heat exchange with an external heat sink. Preferably, the fluid heat exchange includes forced convection of a fluid between isolated, individually-heated reactors. The heat-exchange fluid can be a gas (e.g., air or an inert gas with respect to the chemical reaction of interest, typically such as nitrogen or argon) or can be a liquid. Forced-convection heat-exchange using a gaseous heat-exchange fluid is particularly preferred for some embodiments. For example, use of gaseous heat-exchange fluid avoids the potential for phase change of the heat-exchange fluid for higher-temperature operations (although such phase change may be desirable in other embodiments). Gaseous heat-exchange fluid is particularly advantageous with respect to forced-convection isolation between close-packed reactors, since gasses generally allow for the use of higher linear velocities past the reactors (as compared to liquids), and since gasses generally have lower thermal conductivities (as compared to liquids), which both individually and cumulatively have a positive overall effect on heat-transfer out of and away from the reactors, while eliminating or at least significantly limiting the extent of thermal cross-talk between adjacent reactors. Regardless of the phase or specific type of heat-exchange fluid, the heat-exchange fluid can have a relatively low thermal conductivity, and preferably, a relatively high heat-transfer coefficient with the reactor vessels. Heat transfer between the heat-exchange fluid and each of the individual reactors can be enhanced or optimized using techniques known in the art. For example, the reactors can be fabricated from materials having relatively high thermal conductivity. The external surface of the reactors can be controlled (e.g., by materials selection or by application of one or more coatings) to improve or optimize the heat-transfer coefficient at the surface (e.g., by reducing the thickness of the heat-transfer boundary layer at the surface of the reactor). Also, ultrasonic or megasonic energy can be applied to the reactor to improve the heat-transfer coefficient at the surface of the reactor. As another example, the individual reactors can have an external surface having a relatively high surface area (e.g., greater than the surface area of right-cylindrical vessel of the same volume)—such as can be provided using fins integral with the external surface of the reactor, or in thermally conductive communication with the external surface of the reactor. The forced-convection, fluid-based heat-exchanger can be used as the sole means for thermal isolation between the individually-heated reactors, or alternatively, such fluid-based heat exchanger can be used in combination with solid-material insulation as a thermal barrier between vessels. Hence, a thermal isolation subsystem of the temperature control system can comprise or consist essentially of the fluid-based heat exchanger (as described above and throughout).

The flow path or flow configuration of the heat-exchange fluid is not narrowly critical, and can be adapted to the particular design objectives of interest. In general, the heat-exchange fluid flow configuration can include one or more fresh (e.g., typically relatively cold) fluid inlets substantially in the vicinity of the hottest part of the reactor—typically the center of the reaction zone (e.g., in the midsection of an elongated tube type reactor as shown in FIGS. 1A and 1B)—to provide for maximum temperature differential, and accordingly, maximum thermal heat flux from the reaction zone to the heat-exchange fluid. (See, for example, FIG. 2B and the discussion thereof below). The fluid-based heat exchanger can also have multiple zones, with independent heat-exchange fluid feeds associated with each zone. For example, the fluid-based heat exchanger can have a central zone (taken axially) that includes at least a central portion (e.g., midsection) of the reaction zone of the reactors and one or more end section zones (taken axially), each having independent heat-exchange fluid supply. Particularly preferred embodiments are described hereinafter. Other embodiments are within the skill in the art.

More specifically, in one particularly preferred embodiment, the four or more reactors are elongated reaction vessels having a first end section substantially adjacent the inlet port, a second end section substantially adjacent the outlet port, and a midsection between the first end section and the second end section, with the midsection including a portion of the reaction cavity adapted to contain a catalyst and defining a reaction zone. In this case, the forced-convection heat exchanger can comprise one or more heat-exchange fluid inlets substantially in the vicinity of the midsections of the reactors, such that fresh heat-exchange fluid supplied through the heat-exchange fluid inlet can contact the midsection of the reactors before substantial contact with the first or second end sections thereof. Also, the temperature control system for such reactors can include a forced-convection heat exchanger that comprises at least three heat-exchange zones, each of the zones having one or more independent heat-exchange fluid inlets for supplying fresh heat-exchange fluid to its associated zone. A central heat-exchange zone can be adapted to effect heat transfer from the midsections of the reactors. A first end heat-exchange zone can be adapted to effect heat transfer from the first end sections of the reactors. A second end heat-exchange zone can be adapted to effect heat transfer from the second end sections of the reactors. Additional heat-exchange zones can also be employed. The multiple heat-exchange zones can be isolated, or alternatively, can also have fluid-communication between zones. For example, in the aforedescribed embodiment, the central heat-exchange zone can be in fluid communication with each of the first end heat-exchange zone and the second end heat-exchange zone, such that at least some of the heat-exchange fluid supplied to the central heat-exchange zone can flow to the first end heat-exchange zone and the second end heat-exchange zone after contacting the midsections (near the reaction zones) of the reactors in the central heat-exchange zone.

The thermal control system, comprising the four or more individually-controllable heating elements and the forced convection cooling system considered in combination, provides a robust platform for simultaneous processing or evaluation of materials at different temperatures—even where the reactors are close-packed and/or spatially nested (i.e., configured and arranged in a two-dimensional array having at least one reactor that is about equidistant from at least three other reactors).

Such a thermal control system can be effective, for example, to provide individually variable temperature differences between spatially adjacent reactors ($\Delta T_{adjacent}$) of at least about such that during the course of the reaction, temperature differences of at least about 5° C., preferably at least about 10° C. as compared between four or more spatially adjacent reactors, and in some embodiments, at least about 20° C., at least about 50° C., at least about 100° C., at least about 150° C. or at least about 200° C. Advantageously, such temperature differences can be achieved in arrays of four or more, and preferably higher numbers of reactors as described elsewhere herein, where such reactors are configured and arranged in a close-packed array (e.g., as described above) and additionally or alternatively where such reactors are configured and arranged in a spatially nested array (e.g., as described above). In preferred embodiments, in which six or more reactors each have a volume of less than about 1 ml and are arranged in an array format, optionally a spatially nested-array format, in either case having a spatial density of not less than about 1 reactor/cm$^2$, and in which the reaction temperature (or generally, the chemical processing temperature) is controlled to range from about 300° C. to about 600° C., the individually variable temperature differences can be at least about 10° C. as compared between four or more spatially adjacent reactors, and in some embodiments, at least about 20° C., at least about 50° C., at least about 100° C.

In preferred embodiments of the thermal control system, considered separately and in combination with the above-described preferred embodiments, the heat flux being applied to each of the reactors has an axial profile, where the axial direction is considered to be taken along the length of the flow reactor (i.e., parallel to the direction of flow), such that the heat flux can be spatially varied to achieve a desired temperature profile over a dimension (e.g. length) of the reaction zone. The spatial variance in the thermal flux profile can be fixedly varied (without the opportunity for operator change once the reactor design is fabricated), or alternatively, can be controllably varied (such that an operator can operationally change axial profile from experiment to experiment without redesign of the reactor, but potentially with or without hardware configuration change to the reactor). In one embodiment, for example, a coil-type resistive heater can be employed as heating elements, with the number of turns per linear distance varying along the axial dimension of the reactor. In an alternative example, some portions of the heating element could be separately controlled from other portions thereof (e.g., with higher current through one portion of a resistive heating element) so that the axial thermal flux can be controllably varied. In other approaches, the heating elements could be coupled with spatial variations in insulation, to provide the varied heat flux. Other embodiments are within the skill in the art. Advantageously, axial variation in heat flux can be effected, according to methods known in the art, to provide a substantially uniform axial temperature profile over a dimension of the reaction zone. For example, the heat elements can be configured and arranged to provide the capability to effect a variation in the axial heat flux of each of the four or more reactors such that the axial temperature profile is substantially uniform for each of the four or more reactors, and in some embodiments, such that the axial temperature profile (for the operating temperatures of the reactors, discussed herein) varies by less than about 10%, preferably less than about 5%, more preferably less than about 3% and most preferably less than about 1% over a dimension (e.g., the length) of the reaction zone that corresponds to the axial flow path of the reactants through the flow reactor. As noted, such variations compensate for variations in the heat-flux profile associated with the chemical reaction in the reaction zone, or that associated with the circulating heat-exchange fluid cooling the reactors. The flexibility afforded by such embodiments can also compensate for the varied locations of the four or more reactors relative to other reactors and to the external environment (e.g. centered reactors versus reactors near an external edge of the reactor module). Hence, in a particularly preferred approach, the heating elements for each of the reactors are configured and arranged to controllably vary the axial heat flux, such that a substantially axially-uniform temperature profile for each of the four or more reactors can be achieved—independently of each other, and at different temperatures with respect to each other (i.e., as compared between reactors).

In operation, thermal control system of the invention, and particularly, the four or more heating elements can be independently and controllably varied—relative to other heating elements—to provide for controllably varied temperature differences between individual reactors of the array of reactors. Such variation can be used to investigate and evaluate the effect of reaction temperature (or generally, processing temperatures such as pretreatment temperatures (e.g., calcining temperatures) for heterogeneous catalysts such as mixed-metal oxide catalysts) for a reaction of interest (e.g., using substantially the same catalyst in each reactor). Alternatively, both temperature and one or more additional factors affecting the reaction—e.g., catalyst composition or process variables such as pressure, feed composition, feed flowrate, space velocity, catalyst loading, catalyst shape, catalyst pretreatment history, catalyst synthesis protocols, etc., can be controllably varied (e.g., in the same set of simultaneous experiments), as taught for example in the related applications. As noted, other uses (e.g., generally, materials evaluation, materials characterization, materials treatment) will be apparent to those of skill in the art.

The invention also includes methods for evaluating catalytic reactions or for evaluating one or more materials (e.g. catalysts), or for evaluating process conditions (e.g. temperature) in a parallel flow chemical processing system (e.g. parallel chemical flow reactor). As described, for example, with respect to a parallel flow reactor, reactants are provided to a set of four or more parallel reactors through a fluid distribution system, such that the reactants simultaneously contact a catalyst or catalyst precursor (e.g., substantially the same catalyst or a different catalyst as compared between reactors) under reaction conditions effective for the reaction of interest. The flow rates (and associated parameters such as space velocity) can be the same or different as compared between reactors. The temperature of the reaction zone is independently, and controllably varied between the four or more reactors, preferably using the thermal control system described herein, during the course of the reaction. The reaction products and unreacted reactants (if any) are then simultaneously discharged from the four or more reactors. The catalytic performance (e.g., activity and/or selectivity or other figure of merit) can be determined, for example, by monitoring the reaction or by determining the composition of reaction products and/or unreacted reactants.

In each of the aforementioned chemical reaction systems, the four or more reactors can be of any suitable design, including for example designs modeling or substantially modeling continuous-stirred-tank reactors (CSTR's), fixed bed reactors, fluidized bed reactors, plug-flow reactors, channel-type reactors, etc. Designs modeling or substantially modeling fixed bed, plug-flow and CSTR-type reactors are preferred. For example, in one preferred embodiment, the four or more reactors can be elongated reaction vessels having a first end section substantially adjacent the inlet port, a second end section substantially adjacent the outlet port, and a midsection between the first end section and the second end section. The midsection includes a portion of the reaction cavity that is adapted to contain a catalyst (e.g., using frits). The catalyst-containing portion of the reactors generally defines the reaction zone. The aforementioned copending patent applications of Guan et al. (filed Jun. 9, 1998) and of Bergh et al. (U.S. Ser. No. 09/518,794) include preferred reactor and reactor configuration designs. The reactor types in a particular chemical reaction system can be identical to each other, substantially the same as each other, or varied (e.g., for optimization of reactor-type) in a particular chemical reaction system. Moreover, the four or more reactors of the reaction system are preferably structurally integrated with each other. As one example, structurally integral reactors can be formed in a common reactor block—either a uniform body or a plurality of laminates. As another example, structurally integral reactors can include a common support structure (e.g., can be joined substantially adjacent at least one of their inlet section, outlet section and/or central section by a common support member). Structural integration between the four or more reactors can also be provided by the forced-convection fluid-heat exchanger of the thermal control system. The reaction system can alternatively comprise, however, four or more structurally separate reactors. In either case, the thermal control system is preferably an integral system—having structural and/or control features that are common to each of the four or more reactors (e.g., common forced-convection heat-exchange system or common control software or common microprocessor).

Each of the aforementioned chemical reaction systems (or processing/treatment systems) is preferably a microsystem, in which the volume of the reaction cavity is not more than about 1 ml. In some embodiments, the reaction cavities can have a volume of not more than about 100 μl, not more than about 10 μl, or not more than about 1 μl. The smaller volume reaction systems are particularly advantageous, for example, with respect to heat transfer characteristics, as well as handling and interchanging of modular components (e.g., arrays of diverse materials, flow-restrictor modules, reactor modules, etc.).

The plurality of reactors are two or more reactors, preferably four or more reactors, and more preferably nine or more reactors. Higher numbers of reactors, including sixteen, twentyfour, forty-eight or ninety-six or more reactors are contemplated. When an array of microreactors is used in connection with the invention, the number of reactors can be hundreds or thousands. Additional general features of the reactors together with preferred number of reactors, reactor types, types of candidate materials optionally included within the reactors (especially catalyst candidate materials), variations in composition of the candidate materials (especially variations in catalysts and/or catalyst precursors) loading/unloading of candidate materials into/from the reactors, configurations of arrays of reactors, planar densities of reactors, specific reactor designs, and reactor fabrication approaches are as described in the aforementioned co-pending U.S. patent applications of Guan et al. (U.S. Pat. No. 6,149,882) and Bergh et al. (U.S. Ser. No. 09/518,794), collectively referred to hereinafter as the "Guan et al. and Bergh et al. applications." Such additional general features are hereby specifically incorporated by reference.

The format of the array of reactors is not narrowly critical, and can generally include both spatially nested and not spatially nested arrangements, of varying spatial densities. Preferred configurations include spatially nested arrangements of four or more reactors, preferably six or more reactors (or higher numbers, as described elsewhere herein) having the spatial densities as described above (see, for example, the Summary of the Invention), and additionally or alternatively, preferably having the reactor volumes described herein. Generally, the array of reactors is configured to have at least one spatially nested reactor—that is, at least one reactor that is substantially equidistant from each of at least three other reactors, preferably from each of at least four other reactors, and most preferably from each of at least five other reactors.

Particularly preferred embodiments of the invention will now be described with reference to the several figures.

With reference to FIG. 1A, an integrated chemical reaction system 10 can comprise a tube-type flow-through reactor design (e.g., analogous to a plug-flow reactor). The reaction system 10 can comprise a plurality of microreactors 600. Each of the reactors 600 can comprise, with reference to FIG. 1B, an elongated reaction vessel 70 such as a tube or channel. The elongated reaction vessel 70 can be independent of other structure or can be integrated with and formed at, on or in a substrate (e.g. a plurality of laminae or a unitary body). The elongated reaction vessel 70 is preferably a stainless steel, ceramic, or quartz tube, and without limitation, preferably has a diameter ranging from about 1 mm to about 20 mm, more preferably from about 2 mm to about 10 mm, and most preferably from about 4 mm to about 8 mm. The elongated reaction vessel 70 can be lined with a liner 72 that is inert with respect to the reaction and reaction conditions being evaluated. The liner 72 can be, for example, a glass liner. The liner 72 can be separable from the elongated vessel 70, or integral therewith—such as a lining deposited as a coating on the inner surface of the elongated vessel 70. Typical coating materials include, for example, silica, tungsten, tungsten carbide, titanium and titanium nitride, among others. A candidate material (e.g., catalyst or catalyst precursor material) 74 can be provided to and situated in the elongated reaction vessel 70 in any suitable form—for catalysts as bulk catalyst or as supported catalysts—and in either case in various forms known in the art (e.g., pellets, beads, particulates, microspheres, substantially uniform microspheres, etc). Particle diameters are not narrowly critical, but can typically range from about 1 μm to about 1 mm, more typically from about 10 μm to about 500

μm, and even more typically from about 50 μm to about 250 μm. The candidate material 74 is preferably held in position between porous end caps 126 (e.g., frits, screens, etc.) situated on each of the reactor inlet port 71 and reactor outlet port 73. Optionally, an inert filler 76, and preferably an inert filler 76 having thermal insulating properties can also be provided and situated between the porous end caps 126 and the candidate material 74. Preferably, the inert, thermally insulating filler 76 can be sufficient to maintain the end sections (as shown, generally adjacent to the inlet port 71 and outlet port 73) at a temperature of less than about 200° C. (to facilitate the use of lower-temperature seal materials), and hence, to provide for a temperature difference ranging from at least about 100° C. to at least about 400° C. between the reaction zone (e.g. containing candidate catalyst material 74) and the reactor inlet port 71 (or reactor outlet port 72). The reactors 600 can be fabricated and/or operated using manual, semi-automated or automated instruments (e.g., robotic handling instruments) to provide the candidate materials 74 and/or other components of the reactor 600. The reactors 600 shown in FIGS. 1A and 1B can have a low thermal mass, and can thereby provide for relatively fast thermal cycling for processing/treatment of the candidate materials (e.g., for calcining of catalysts or catalyst precursors) and for establishing and/or varying reaction conditions in the reactors 600.

Referring again to FIG. 1A, the material-containing reactors 600 are formed as an array 100 of reactors 600, with each reactor 600 supported near the reactor inlet port 71 and the reactor outlet port 73 by a first and second support plates 954, 955. As shown, the plurality of reactors 600 are heated by temperature control blocks—shown as beaters 980—adjacent to the material-containing portion of the reactors 600 and in thermal communication therewith. As such, the center, material-containing region of the reaction system 10 can be a relatively "hot zone" region, while the inlet and outlet-containing regions can be relatively "cold zone" regions. The temperature can be varied between reaction vessels 600, and temperature variations (e.g., gradients) can also, as desired, be established with multiple temperature zones along a single reactor 600 and/or along the material-containing portion of a single reactor 600. Seals, and preferably releasable seals between the fluid distribution system and the reactors 600 can be provided and integrated into the support plates 954, 955. Advantageously, such a design allows for the fluid-distribution seals to be located in the cold zones—and outside of the hot-zone, thereby providing for greater flexibility with respect to sealing materials, etc. Exemplary sealing materials include graphite, fluoropolymer, metal seals, or other seal materials. Reactants 20 can be provided to the reactors 600 through an inlet distribution subsystem 500 in fluid communication with the microreactors 600. The inlet distribution subsystem 500 can comprise a first set 510 of inlet flow restrictors, and optionally, a feed-composition varying subsystems (not shown in FIG. 1A). After contacting the candidate materials (e.g., catalysts) 74 under the variably controlled reaction conditions, reactor effluents 60 are passed through an outlet (discharge) distribution subsystem 501, and further to an external distribution (waste) system. The outlet distribution subsystem 501 can comprise a second set 520 of outlet flow restrictors. The inlet and outlet distribution subsystems 500, 501 can be thermally isolated from the microreactors 600 (e.g., by air or other insulating gas, by temperature control block, etc.) Evaluation of the candidate materials can be determined by analysis of reaction products, for example, by sampling of the reactor effluent streams as described above and/or in connection with the Guan et al. and Bergh et al. applications. The chemical reaction system can optionally be contained within a heated environment (e.g., an oven 750, and in operation, a heated oven)—particularly when liquid reagents are employed—to provide for additional thermal energy to keep the feed stream and effluent streams in the vapor phase.

In a preferred embodiment, the invention is exemplified by a twenty-four channel, parallel-flow reaction system for effecting twenty-four simultaneous reactions. Each of the twenty-four reactors can be a fixed-bed type flow reactor, allowing for evaluation of candidate catalysts under varied process conditions. The reactor can also include a temperature-control subsystem for controlling, individually, the temperature of each of the twenty-four reactors.

Figure 2C:
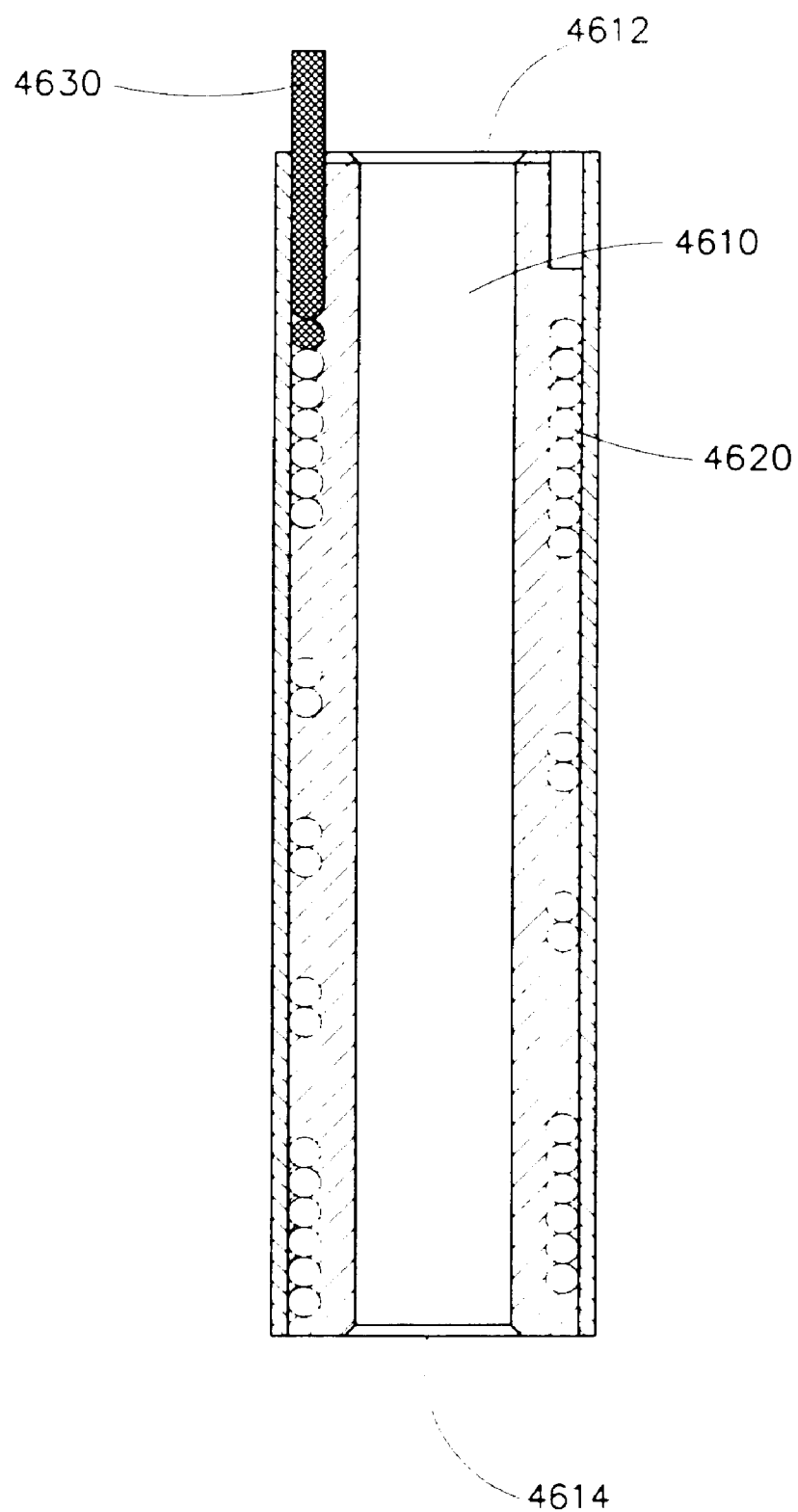

The reactor module 4600, shown as a cut-away schematic in FIG. 2A, comprises a 4×6 array of twenty-four reactor tubes 4610 individually supported in a reactor frame 4605. Each tube has a reaction volume of about 1 ml. Each of the reactor tubes 4610 can be individually heated using resistive coil heaters 4620 (e.g. Watlow Mini-K-ring). Thermal isolation between reactor tubes 4610 is achieved using fluid-type heat exchanger to cool the inter-reactor volume within the reactor frame 4610. FIG. 2B shows a general schematic flow diagram for the heat-exchange fluid flowpath through the array of reactors 4610. Referring to both FIGS. 2A and 2B, preferably, the cooling medium is air or inert gas, and is fed into the reactor module 4600 substantially at the mid-section thereof—adjacent the central portion of the reaction zone of the reactors 4610, in a first, primary central heat-exchange zone. The heat-exchange medium contacts each of the reactors substantially at its center, then generally splits and flows towards each end of the reactors (4612, 4614). Plate cooling fluid (e.g. air) is also fed through the top member 4606 and bottom member 4607 of the reactor frame 4605, specifically through heat-exchange channels 4608 formed therein, in a set of secondary, end heat-exchange zones. Advantageously, as described in greater detail above, and with reference to FIG. 2C, the heat flux associated with the resistive coil heaters 4620 can be axially varied to account for heat variations due to the reaction, and to balance heat removal by the cooling media such that a substantially axial uniform temperature profile is obtained. FIG. 2C shows a detail of one half of the resistive coil heaters 4620, with axial variation in the number of winds of the resistive heating wire. The wire connection 4630 allows for individual, controlled heat input for each of the reactors. The feed gas flows into the reactor tube inlet 4612, and optionally contacts a catalyst (e.g. supported in the reactor tube using frits (not shown)) under reaction conditions to effect the chemical reaction of interest. The reaction products and unreacted reactants are discharged through the reactor tube outlet 4614.

Although described particularly in connection with gas and liquid phase chemical reaction systems, the present invention has, as noted above, applications in other areas, including for example, as a parallel adsorbent system, extraction system and/or solubilization systems for research and development in, for example, the gas processing fields, environmental applications or in pharmaceutical manufacturing. The chemical processing systems described herein can also be employed, for example, in connection with solid-state chemistry and solid-state material research and development. In any of the aforementioned applications, evaluation of candidate materials and/or of processing conditions can be effected by characterizing one or more properties of the plurality of candidate materials (e.g., crystal structure) after processing in the chemical processing system.

In light of the detailed description of the invention and the examples presented above, it can be appreciated that the several objects of the invention are achieved.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

We claim:

1. A method for evaluating catalytic reactions at various process temperatures in a parallel flow chemical reactor, the method comprising
   simultaneously feeding reactants to a set of four or more parallel reactors of a parallel flow reaction system, comprising
      i) four or more reactors configured and arranged in an array with a center-to-center distance between adjacent reactors of not more than about 10 times the diameter of the reactor for reactors with circular cross-sections, or not more than about 10 times the length of a chord intersecting the center of the reactor for reactors having a non-circular cross-section, each of the four or more reactors comprising a surface defining a reaction cavity for carrying out a chemical reaction, an inlet port in fluid communication with the reaction cavity, and an outlet port in fluid communication with the reaction cavity, the four or more reactors being adapted for effecting a chemical reaction at reaction temperatures of greater than about 100° C. each of the four or more reactors comprising a catalyst effective for catalyzing a reaction of interest, the catalyst being substantially the same or different as compared between the four or more reactors,
      ii) a fluid distribution system for simultaneously supplying one or more reactants to the reaction cavity of each of the four or more reactors, and for discharging a reactor effluent from the outlet port of each such reaction cavity to one or more effluent sinks, and
      iii) a temperature control system comprising four or more individually-controllable heating elements in thermal communication with the four or more reactors, respectively, for simultaneously and individually controlling the temperature of each of the four or more reactors, the temperature control system being adapted to provide individually variable temperature differences of at least about 10° C. as compared between four or more spatially adjacent reactors,
   simultaneously contacting the reactants with the catalysts in each of the four or more reactors under reaction conditions effective for the reaction of interest,
   independently and controllably varying the temperature of the reaction zone of each of the four or more reactors using the temperature control system to be at least about 100° C. during the course of the reaction, and
   determining the catalytic performance for each of the four or more reactions.

2. A method for evaluating catalytic reactions at various process temperatures in a parallel flow chemical reactor, the method comprising
   simultaneously feeding reactants to a set of four or more parallel reactors through a fluid distribution system, each of the four or more reactors comprising a catalyst effective for catalyzing a reaction of interest, the catalyst being substantially the same or different as compared between the four or more reactors,
   simultaneously contacting the reactants with the catalysts in each of the four or more reactors under reaction conditions effective for the reaction of interest,
   independently controlling the temperature of the reaction zone of each of the four or more reactors to effect a temperature of at least about 100° C. and a variation in temperature of at least about 10° C. as compared between four or more spatially adjacent reactors during the course of the reaction, and
   determining the catalytic performance for each of the four or more reactions.

3. The method of claim 2 further comprising heating the reaction cavity of each of the four or more reactors with an axially-varying heat flux.

4. The method of claim 3 wherein the heat flux is varied such that the reaction cavity has a substantially uniform temperature over its axial dimension.

5. The method of claim 2 wherein the catalytic performance of each of the four or more reactions is determined by monitoring the reaction or by determining the composition of reaction products and/or unreacted reactants.

6. The method of claim 2 wherein the four or more reactors each have a reaction cavity volume of not more than about 1 ml, the four or more reactors configured and arranged in an array having at least one reactor that is about equidistant from at least three other reactors such that the spatial density of four or more reactors in the array is not less than about 1 reactor/10 $cm^2$, and the temperature control system is adapted to provide individually variable temperature differences of at least about 50° C. as compared between four or more spatially adjacent reactors.

7. The method of claim 6 wherein the four or more reactors are configured and arranged such that the spatial density of four or more reactors in the array is not less than about 1 reactor/1 $cm^2$.

8. A method for evaluating catalytic reactions at various process temperatures in a parallel flow chemical reactor, the method comprising
   simultaneously feeding reactants to a set of four or more parallel reactors through a fluid distribution system, each of the four or more reactors comprising a catalyst effective for catalyzing a reaction of interest the catalyst being substantially the same or different as compared between the four or more reactors,
   simultaneously contacting the reactants with the catalysts in each of the four or more reactors under reaction conditions effective for the reaction of interest,
   independently controlling the temperature of the reaction zone of each of the four or more reactors to be at least about 100° C.,
   heating the reaction cavity of each of the four or more reactors with an axially-varying heat flux, and
   determining the catalytic perfonnance for each of the four or more reactions.

9. The method of claim 8 wherein the reaction cavity of each of the four or more reactors is heated with an axially-varying heat flux to provide a substantially uniform temperature proflie along the direction of reactant flow through a reaction zone of the reactors.

* * * * *

UNITED STATES PATENT AND TRADEMARK OFFICE
CERTIFICATE OF CORRECTION

PATENT NO. : 7,118,917 B2                                Page 1 of 1
APPLICATION NO. : 10/094257
DATED : October 10, 2006
INVENTOR(S) : Bergh et al.

It is certified that error appears in the above-identified patent and that said Letters Patent is hereby corrected as shown below:

On the coversheet of the patent, Item (54), the title should be corrected to read:

"Methods for Using Parallel Flow Reactor Having Improved Thermal Control"

On the coversheet of the patent, Item (75), the following individuals should be deleted from the list of inventors:

"Steffen Hardt, Mainz (DE)

Astrid Lohf, Karlsruhe (DE)

Frank Michel, Bad Mergenthaim (DE)"

On page 2 of the cover page of the patent, Under Item (56) References Cited, Foreign Patent Documents:
"WO  WO 98/07026  2/1996" should read, --WO  WO 98/07026  2/1998--

Col. 15, Line 37, insert a comma after "100° C."

Col. 16, Line 48, insert a comma after "a reaction of interest"

Col. 16, Line 59, replace "perfonnance" with --performance--

Col. 16, Line 64, replace "proflie" with --profile--

Signed and Sealed this

Thirtieth Day of January, 2007

JON W. DUDAS
*Director of the United States Patent and Trademark Office*